(12) United States Patent
Ko et al.

(10) Patent No.: US 11,824,788 B2
(45) Date of Patent: Nov. 21, 2023

(54) APPARATUSES AND METHODS FOR SUPPORTING CLASS-BASED SCHEDULING IN A TIME-SENSITIVE NETWORKING (TSN) NETWORK

(71) Applicant: MOXA INC., New Taipei (TW)

(72) Inventors: Yueh-Ming Ko, New Taipei (TW); Tzu-Lun Huang, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 17/376,312

(22) Filed: Jul. 15, 2021

(65) Prior Publication Data

US 2022/0345415 A1 Oct. 27, 2022

Related U.S. Application Data

(60) Provisional application No. 63/177,989, filed on Apr. 22, 2021.

(51) Int. Cl.
| | |
|---|---|
| *H04L 47/28* | (2022.01) |
| *H04L 12/46* | (2006.01) |
| *H04L 45/16* | (2022.01) |
| *H04L 47/2441* | (2022.01) |
| *H04L 47/2483* | (2022.01) |

(52) U.S. Cl.
CPC .......... *H04L 47/28* (2013.01); *H04L 12/4645* (2013.01); *H04L 45/16* (2013.01); *H04L 47/2441* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 9,882,823 B2 | 1/2018 | Pannell | |
| 11,245,732 B2 | 2/2022 | Chen | |
| 11,336,582 B1* | 5/2022 | Francini | ................ H04L 47/527 |
| 2018/0237039 A1 | 8/2018 | Mong | |
| 2018/0302331 A1* | 10/2018 | Bush | ........................ H04L 47/28 |
| 2019/0121781 A1* | 4/2019 | Kasichainula | ...... H04L 12/4645 |
| 2019/0356612 A1* | 11/2019 | Hikimochi | .......... H04L 49/9084 |
| 2020/0137615 A1* | 4/2020 | Joseph | .................. H04W 24/02 |
| 2020/0259896 A1 | 8/2020 | Sachs | |
| 2020/0351973 A1* | 11/2020 | Mannweiler | .......... H04W 88/18 |

(Continued)

FOREIGN PATENT DOCUMENTS

| | | |
|---|---|---|
| CN | 108282415 A | 7/2018 |
| CN | 108965171 A | 12/2018 |

(Continued)

*Primary Examiner* — Anh Vu H Ly
(74) *Attorney, Agent, or Firm* — Winston Hsu (57) ABSTRACT

An apparatus connected to a Time-Sensitive Networking (TSN) switch in a TSN network is provided. The apparatus includes a transceiver, a storage medium, and a controller. The storage medium stores a first mapping of a traffic class to a time slot, and a second mapping of a frame type of a TSN stream to the traffic class. The controller is coupled to the transceiver and the storage medium, and is configured to determine a routing path and a Gate Control List (GCL) corresponding to the TSN stream based on a network topology of the TSN network, the first mapping, and the second mapping, and deploy the GCL to each TSN switch in the routing path via the transceiver.

16 Claims, 9 Drawing Sheets

(56) References Cited

U.S. PATENT DOCUMENTS

| | | | |
|---|---|---|---|
| 2021/0117353 A1* | 4/2021 | Kasichainula | G06F 13/28 |
| 2021/0194819 A1 | 6/2021 | Chen | |
| 2021/0377189 A1* | 12/2021 | Yamaura | H04L 47/6295 |
| 2022/0046462 A1* | 2/2022 | De Andrade Jardim | H04L 47/2416 |
| 2022/0104062 A1* | 3/2022 | Aijaz | H04W 28/0268 |

FOREIGN PATENT DOCUMENTS

| | | | |
|---|---|---|---|
| CN | 110943899 A | 3/2020 | |
| CN | 111740924 A | 10/2020 | |
| CN | 111970212 A | 11/2020 | |
| EP | 3503485 A1 * | 6/2019 | H04L 47/20 |
| EP | 3869752 A1 | 8/2021 | |
| JP | 2017-521914 A | 8/2017 | |
| JP | 2020-510342 A | 4/2020 | |
| JP | 2021-136688 A | 9/2021 | |
| JP | 2021-536708 A | 12/2021 | |
| WO | 2020/057766 A1 | 3/2020 | |
| WO | WO-2021069552 A1 * | 4/2021 | H04L 47/20 |

* cited by examiner

Cycle Name: FA1
Cycle Base Time: 2020:02:10/12:01:01:00
Cycle duration: 1000μs

| Time slot | Traffic class | Duration (μs) |
|---|---|---|
| 0 | Best Effort ▼ | 200 |
| 1 | Cyclic ▼ | 400 |
| 2 | TimeSync ▼ | 100 |
| 3 | User Defined ▼ | 150 |
| 4 | User Defined ▼ | 150 |
| 5 | N/A ▼ | 0 |
| 6 | N/A ▼ | 0 |
| 7 | N/A ▼ | 0 |

FIG. 5

| BE | Cyclic | TimeSync | UD | UD | N/A | N/A | N/A |
|---|---|---|---|---|---|---|---|

☐ Unicast  ☑ Multicast

Time Slot #1 TSN
Unicast Group 1:
Unicast Destination MAC Address:  :  :  :  :  :
Talker IP Address:  .  .  .
Listener IP Address:  .  .  .
Frame Type: CC-Link IE
Stream Name: F1
  EtherType: 0x890F
☑ SubType: 0xC1

| Frame Type ▼ |
|---|
| CC-Link IE |
| EtherCAT |
| PROFINET |
| Ethernet/IP |
| User Defined |
| TSN |

| IP addr. | Port | Time slot | Traffic class | Stream name | PCP (Queue) | VID |
|---|---|---|---|---|---|---|
| 192.1.1.1 | 1 | 1 | Cyclic | F1 | 7 | 100 |

FIG. 8

| IP addr. | Port | Time slot | Traffic class | Stream name | PCP (Queue) | VID |
|---|---|---|---|---|---|---|
| 192.1.1.1 | 1 | 1 | Cyclic | F1 | 7 | 100 |
| 192.1.1.1 | 1 | 1 | Cyclic | F2 | 7 | 101 |
| 192.1.1.1 | 1 | 1 | Cyclic | F3 | 7 | 102 |
| 192.1.1.1 | 1 | 3 | User Defined | F4 | 5 | 103 |
| 192.1.1.1 | 1 | 4 | User Defined | F5 | 4 | 104 |
| 192.1.1.2 | 2 | 1 | Cyclic | F1 | 7 | 100 |
| 192.1.1.2 | 2 | 1 | Cyclic | F2 | 7 | 101 |
| 192.1.1.2 | 2 | 1 | Cyclic | F3 | 7 | 102 |
| 192.1.1.2 | 2 | 1 | User Defined | F4 | 5 | 103 |
| 192.1.1.2 | 2 | 1 | User Defined | F5 | 4 | 104 |
| 192.1.1.2 | 3 | 1 | Cyclic | F1 | 7 | 100 |
| 192.1.1.2 | 3 | 1 | Cyclic | F2 | 7 | 101 |

APPARATUSES AND METHODS FOR SUPPORTING CLASS-BASED SCHEDULING IN A TIME-SENSITIVE NETWORKING (TSN) NETWORK

CROSS REFERENCE TO RELATED APPLICATIONS

This application claims priority under 35 U.S.C. § 119 from U.S. Provisional Application No. 63/177,989, entitled "Traffic isolation scheduling for centralized configuration in a time sensitive network (TBD)", filed on Apr. 22, 2021, the subject matter of which is incorporated herein by reference.

BACKGROUND OF THE APPLICATION

Field of the Application

The application generally relates to Time-Sensitive Networking (TSN) and, more particularly, to apparatuses and methods for supporting class-based scheduling in a TSN network.

Description of the Related Art

The rise of new digital industrial technology, known as Industry 4.0, is a transformation that makes it possible to gather and analyze data across machines, enabling faster, more flexible, and more efficient processes to produce higher-quality goods at reduced costs. One of the core entities at the center of Industry 4.0 are cyber-physical systems. By definition, these systems require representation in cyberspace. For that, the Operations Technology (OT) networks which connect the production equipment and the Information Technology (IT) networks from the upper factory layers will need to converge.

Unfortunately, most of the industrial Ethernet standards in the current generation require proprietary hardware. This makes the convergence of networks close to impossible. The consequences are island networks that need gateways to be connected to other hierarchies. To meet these needs, Time-Sensitive Networking (TSN) technology has been proposed by the Institute of Electrical and Electronics Engineers (IEEE) 802.1 working groups which combines a set of IEEE standards in order to achieve real-time deterministic behavior, while being both vertically and horizontally scalable.

Traditionally, in an OT network, traffic is classified into different classes and traffic of different classes is transmitted in different time slots, so that critical traffic can be free from being interrupted by traffic of other classes. On the other hand, in an IT network, traffic is not managed to transmit in such class-based scheduling. As a result, when an IT network converges with an OT network, the critical traffic transmission will be interrupted by IT traffic. This situation is common in the migration from an OT network to a TSN network, since TSN switches may coexist with TSN end devices and non-TSN end devices in the converged network.

Therefore, it is desirable to have a robust way of allowing data streams to be transmitted in the class-based scheduling with guaranteed end-to-end latency in a TSN network.

BRIEF SUMMARY OF THE APPLICATION

In one aspect of the application, an apparatus connected to a Time-Sensitive Networking (TSN) switch in a TSN network is provided. The apparatus comprises a transceiver, a storage medium, and a controller. The storage medium is configured to store a first mapping of a traffic class to a time slot and a second mapping of a frame type of a TSN stream to the traffic class. The controller is coupled to the transceiver and the storage medium, and is configured to determine a routing path and a Gate Control List (GCL) corresponding to the TSN stream based on a network topology of the TSN network, the first mapping, and the second mapping, and deploy the GCL to each TSN switch in the routing path via the transceiver.

In another aspect of the application, a method executed by an apparatus connected to a TSN switch in a TSN network is provided. The method comprises the following steps: receiving a first mapping of a traffic class to a time slot and a second mapping of a frame type of a TSN stream to the traffic class; determining a routing path and a GCL corresponding to the TSN stream based on a network topology of the TSN network, the first mapping, and the second mapping; and deploying the GCL to each TSN switch in the routing path.

In yet another aspect of the application, a TSN switch comprising an ingress port, an egress port, and a controller is provided. The egress port comprises a plurality of queues and a plurality of gates corresponding to the queues. The controller is coupled to the ingress port and the egress port, and is configured to receive a GCL corresponding to a frame type of a TSN stream from a CNC server via the ingress port, and configure the egress port using the GCL to open one of the gates in a time slot to transmit a frame in one of the queues, which corresponds to the opened gate; wherein the frame type is corresponding to a traffic class corresponding to the time slot.

Other aspects and features of the present application will become apparent to those with ordinarily skill in the art upon review of the following descriptions of specific embodiments of the apparatuses and methods for supporting class-based scheduling in a TSN network.

BRIEF DESCRIPTION OF THE DRAWINGS

The present application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
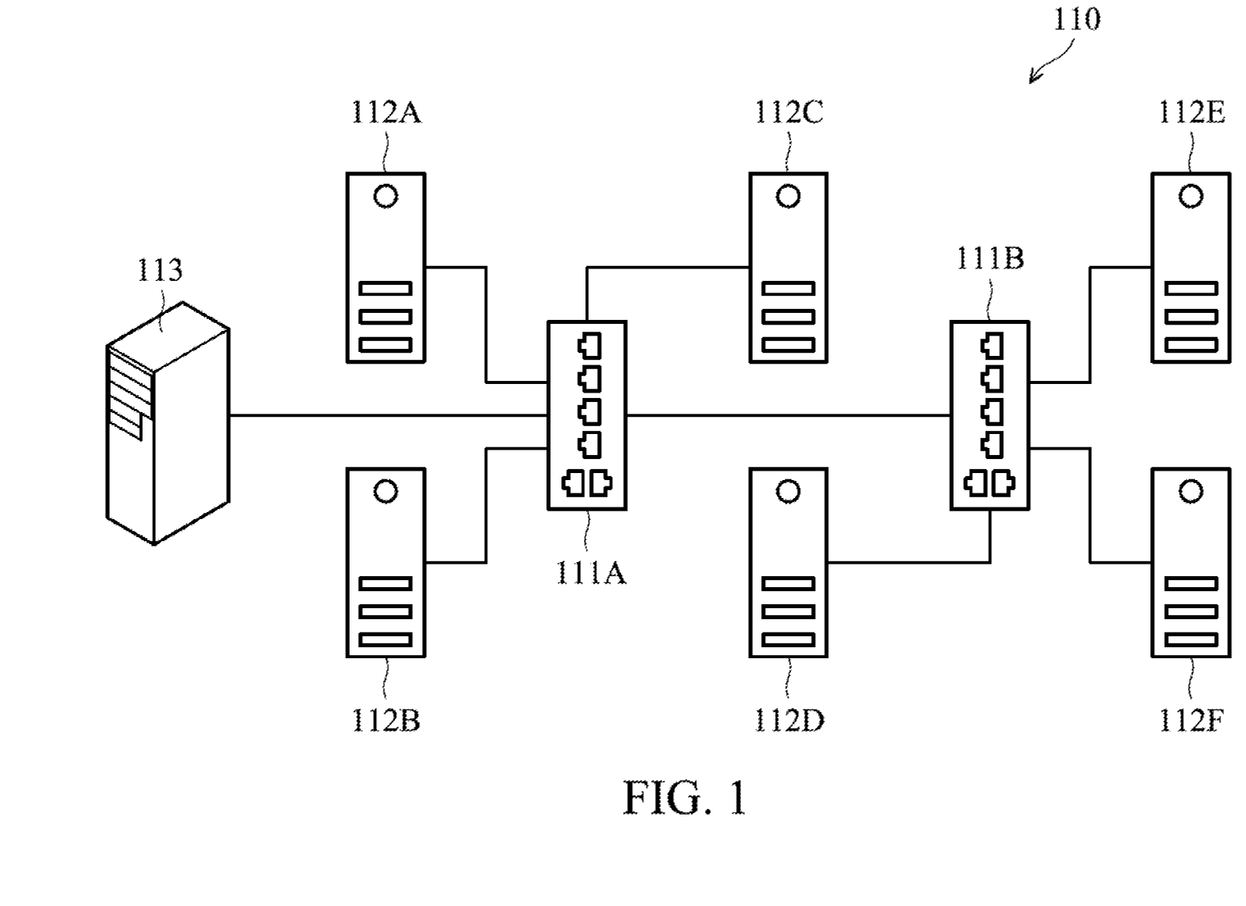
FIG. 1 is a block diagram of a TSN network according to an embodiment of the application.

FIG. 1 is a block diagram of a TSN network according to an embodiment of the application.

As shown in FIG. 1, the TSN network 110 may include multiple network devices 111A~111B, wherein each of the network device 111A~111B may be a TSN gateway/switch/router/bridge. Each of the network devices 111A~111B may connect with one or more terminal devices, each of which may be a TSN end device or a non-TSN end device. For example, the network device 111A is connected with a machinery 112A, a security camera 112B, and robotic arm 112C, while the network device 111B is connected with a conveyor 112D, a printer 112E, and a security lock 112F.

In addition, the TSN network 110 may include a Central Network Configuration (CNC) server 113 which is responsible for managing the configuration of the network devices 111A~111B to realize real-time deterministic communication within the TSN network 110. More importantly, the CNC server 113 is capable of configuring the network devices 111A~111B to allow data streams (including TSN streams and non-TSN streams) to be transmitted in the class-based scheduling (i.e., traffic of different classes is transmitted in different time slots) with guaranteed end-to-end latency in the TSN network 110. Specifically, the CNC server 113 may perform a topology discovery procedure to determine the topology of the TSN network 110 or may receive the network topology from user input. Based on the network topology, application cycle configuration, and unicast/multicast group configuration, the CNC server 113 may determine the routing paths for data streams to be communicated in the TSN network 110, and the Gate Control Lists (GCLs) corresponding to the data streams. After that, the CNC server 113 may deploy the GCLs to the TSN switches that are in the routing path.

It should be understood that the components described in the embodiment of FIG. 1 are for illustrative purposes only and are not intended to limit the scope of the application. For example, the network topology of the TSN network 110 may be any combination of a line topology, a star topology, a ring topology, and a mesh topology.

Figure 2:
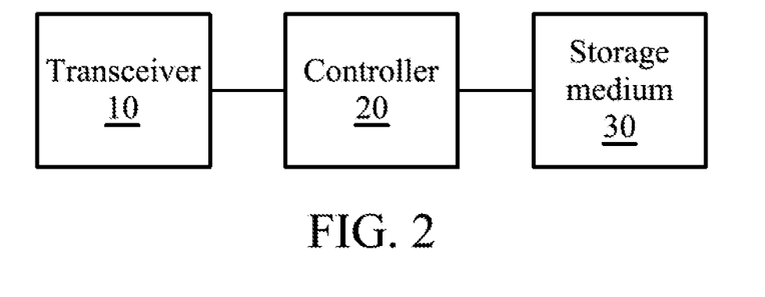
FIG. 2 is a block diagram illustrating a CNC server according to an embodiment of the application.

FIG. 2 is a block diagram illustrating a CNC server according to an embodiment of the application.

As shown in FIG. 2, a CNC server may include a transceiver 10, a controller 20, and a storage medium 30.

The transceiver 10 is configured to provide the function of data streams communication (e.g., over Ethernet) within the TSN network 110.

The controller 20 may be a general-purpose processor, a Micro Control Unit (MCU), a Digital Signal Processor (DSP), or the like, which includes various circuits for providing the functions of data processing and computing, controlling the transceiver 10 for communicating data streams within the TSN network 110, and storing and retrieving data (e.g., a first mapping of a traffic class to a time slot and a second mapping of a frame type of a TSN stream to the traffic class) to and from the storage medium 30.

In particular, the controller 20 coordinates the aforementioned operations of the transceiver 10 and the storage medium 30 for performing the methods of the present application.

As will be appreciated by persons skilled in the art, the circuits of the controller 20 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage medium 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., the application cycle configuration, the unicast group configuration, and the multicast group configuration), instructions, and/or program code of applications, communication protocols, and/or the methods of the present application. In one example, the application cycle configuration and the unicast/multicast group configuration may be received from a user via a Graphical User Interface (GUI) or via the transceiver 10, depending on the form of implementation.

It should be understood that the components described in the embodiment of FIG. 2 are for illustrative purposes only and are not intended to limit the scope of the application. For example, a CNC server may include more components, such as an Input/Output (I/O) device (e.g., one or more buttons, one or more light emitters, a speaker, a keyboard, a mouse, a touch pad, and/or a display device).

Figure 3:
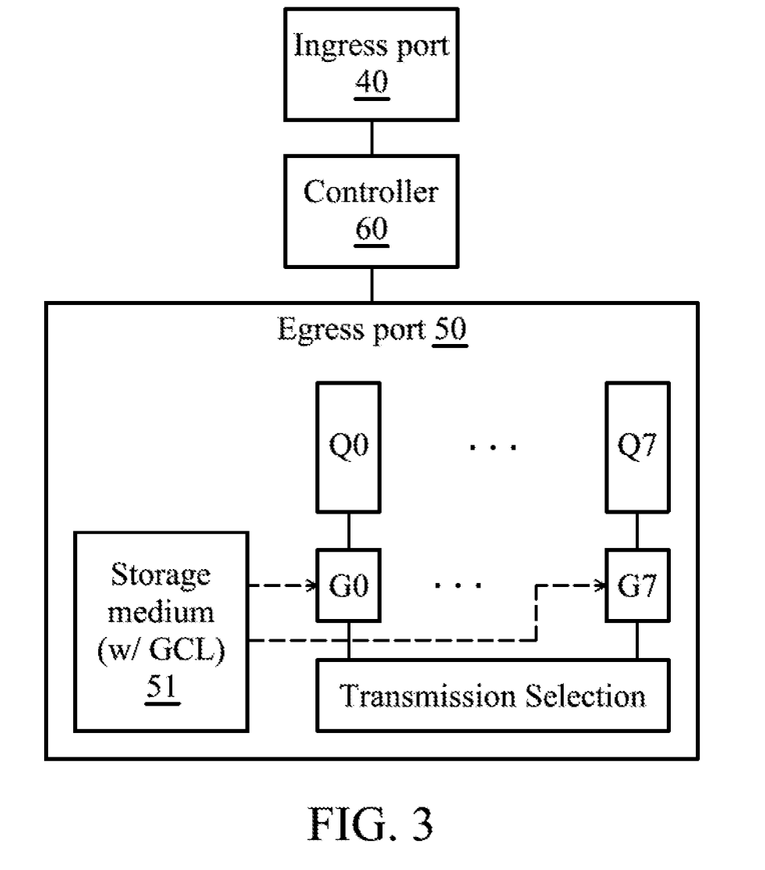
FIG. 3 is a block diagram illustrating a TSN switch according to an embodiment of the application.

FIG. 3 is a block diagram illustrating a TSN switch according to an embodiment of the application.

As shown in FIG. 3, a TSN switch may include an ingress port 40, an egress port 50, and a controller 60.

The ingress port 40 is configured to receive the GCL corresponding to a frame type of a TSN stream from the CNC server 113, and receive frames (or called packets) communicated within the TSN network 110.

The egress port 50 comprises a storage medium 51 for storing the GCL, a plurality of queues Q0~Q7 for buffering the frames to be routed, a plurality of gates G0~G7 for controlling the transmission operation associated with the frames buffered in the queues Q0~Q7, and a transmission selection circuit for frame transmission based on the configured unicast/multicast destination MAC address and VID. The queues Q0~Q7 and the gates G0~G7 have a one-on-one mapping.

The controller 60 may be a general-purpose processor, an MCU, a DSP, or the like, which includes various circuits for providing the functions of data processing and computing, controlling the ingress port 40 for receiving GCL and frames, and configuring the egress port 50 using the GCL to open one of the gates G0~G7 in a time slot to transmit a frame in one of the queues, which corresponds to the opened gate.

As will be appreciated by persons skilled in the art, the circuits of the controller 60 may include transistors that are configured in such a way as to control the operation of the circuits in accordance with the functions and operations described herein. As will be further appreciated, the specific structure or interconnections of the transistors may be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

It should be understood that the components described in the embodiment of FIG. 3 are for illustrative purposes only and are not intended to limit the scope of the application. For example, a network device may include more components, such as more ingress ports, more egress ports, and/or an I/O device (e.g., one or more buttons, one or more light emitters, a speaker, a keyboard, a mouse, a touch pad, and/or a display device).

Figure 4:
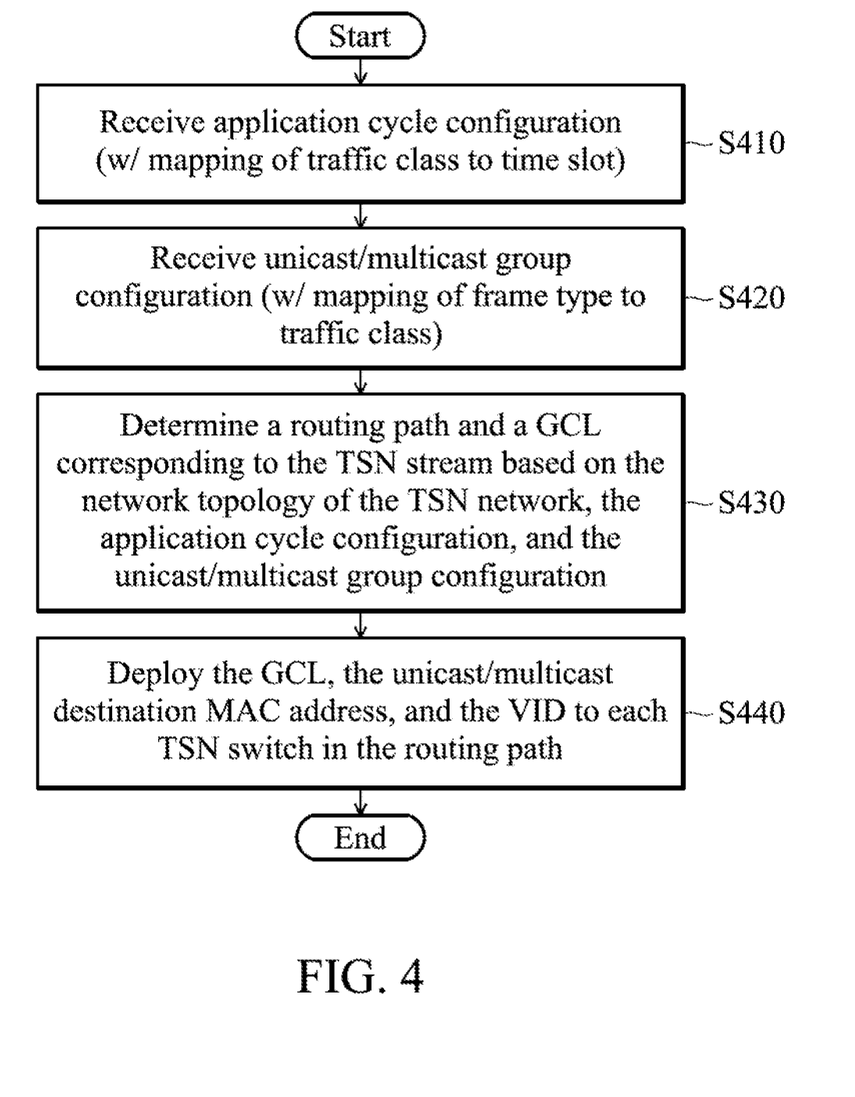
FIG. 4 is a flow chart illustrating the method for supporting class-based scheduling in a TSN network according to an embodiment of the application.

FIG. 4 is a flow chart illustrating the method for supporting class-based scheduling in a TSN network according to an embodiment of the application.

In this embodiment, the method is applied to and executed by an apparatus configured as a CNC server (e.g., the CNC server 113) to managing the configuration of TSN switches.

In step S410, the apparatus receives application cycle configuration, e.g., from a user. Specifically, the application cycle configuration may refer to the configuration of a time cycle comprising one or more time slots. The application cycle configuration may include the following information: (1) the name of the time cycle, (2) the starting time (or called base time) of the time cycle, (3) the duration of the time cycle, (4) the index of each time slot, (5) the duration of each time slot, and (6) the corresponding traffic class of each time slot (which can also be referred to as a mapping of a traffic class to a time slot). That is, the application cycle configuration can be understood as having information concerning a mapping of a traffic class to a time slot.

Figure 5:
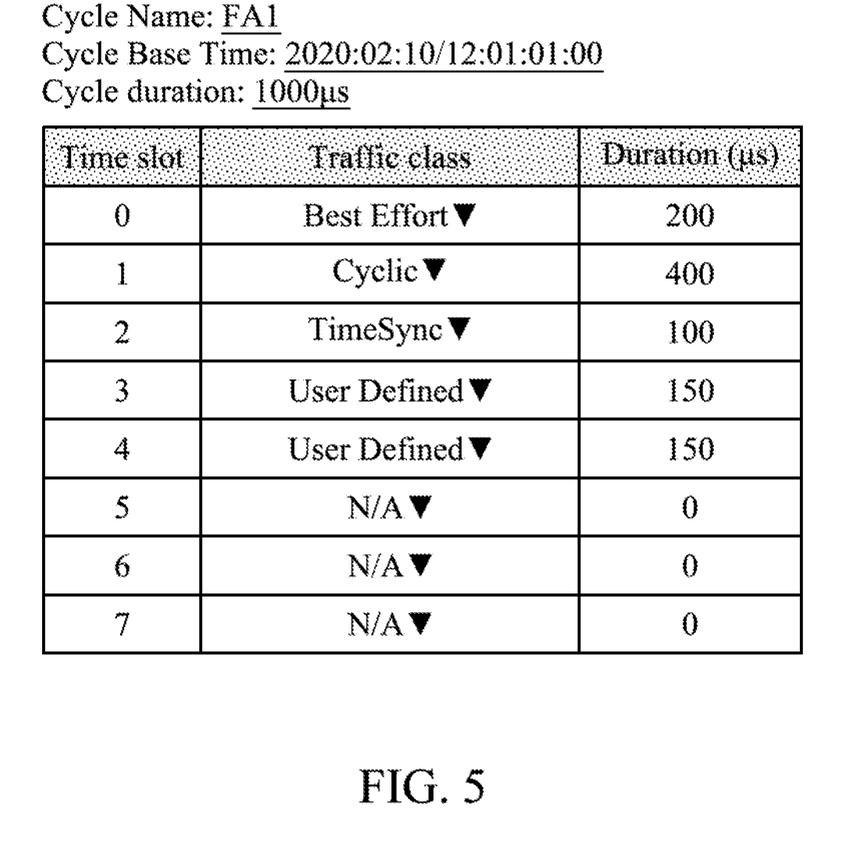
FIG. 5 is a schematic diagram illustrating the Graphical User Interface (GUI) for configuring a time cycle according to an embodiment of the application.

In one example, there can be four traffic classes, including Best Effort (BE), Cyclic, Time Synchronization (TimeSync), and User-defined, but the application should not be limited thereto. FIG. 5 is a schematic diagram illustrating the Graphical User Interface (GUI) for configuring a time cycle according to an embodiment of the application. As shown in FIG. 5, the name of the time cycle is "FA1", the base time of the time cycle is 2020:02:10/12:01:01:00 which is presented in the format of year:month:day/hour:munite:second: microsecond, and the duration of the time cycle is 1000 microseconds (μs).

In step S420, the apparatus receives unicast/multicast group configuration, e.g., from the user. Specifically, the unicast group configuration may refer to the configuration of a unicast group associated with a TSN stream. The unicast group configuration may include the following information: (1) the name of the TSN stream, (2) the unicast destination Media Access Control (MAC) address, (3) the talker Internet Protocol (IP) address, (4) the listener IP address, and (5) the frame type of the TSN stream of a traffic class (i.e., the information of the frame type can be referred to as a mapping of a frame type to a traffic class). That is, the mapping of frame types to traffic classes may be derived from the unicast group configuration.

Figure 6:
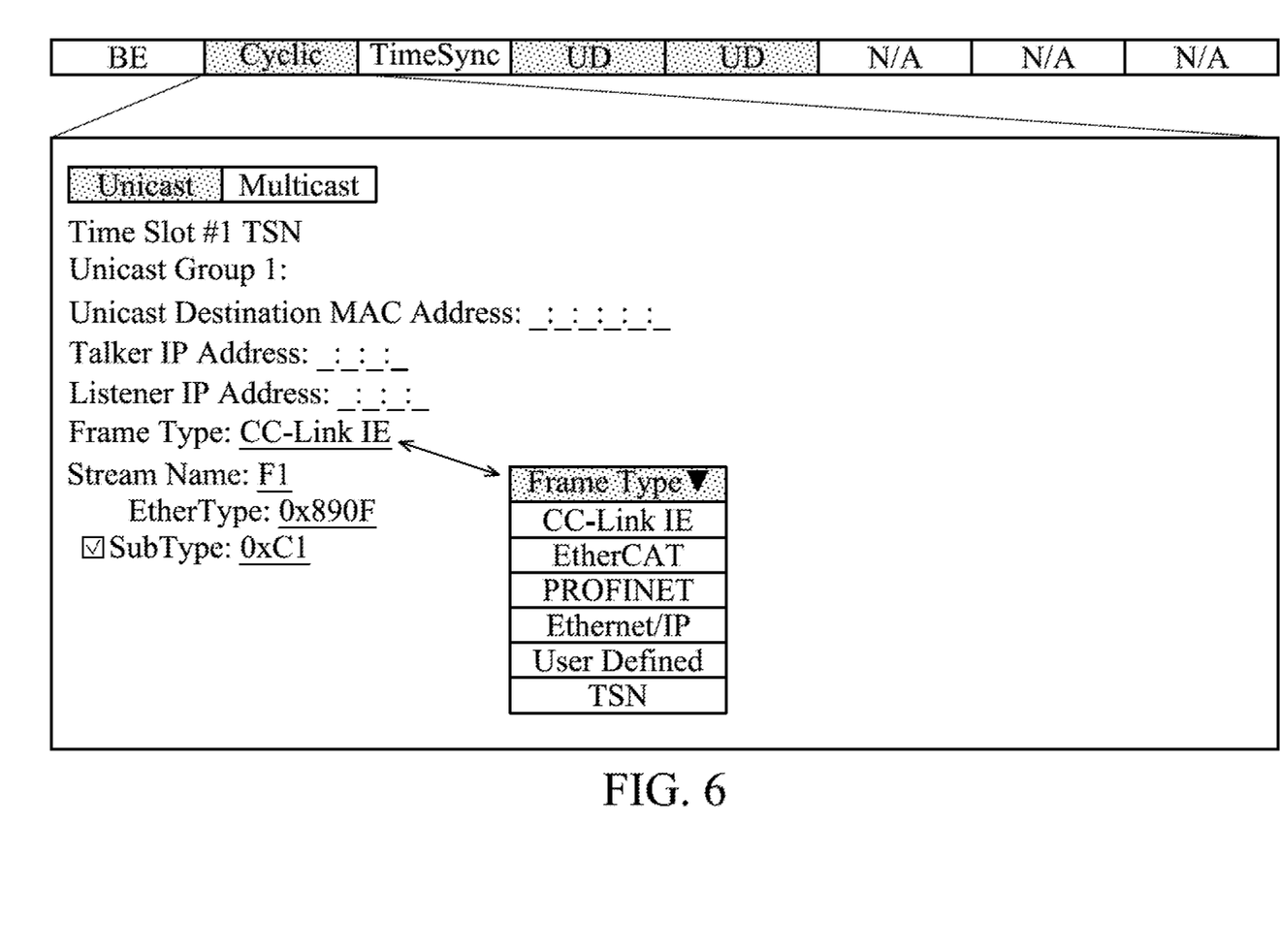
FIG. 6 is a schematic diagram illustrating the GUI for configuring a unicast group according to an embodiment of the application.

In one example, there can be six frame types, including Control and Communication Link using Industrial Ethernet (CC-Link IE), EtherCAT, PROFINET, Ethernet/IP, User-defined, and TSN, but the application should not be limited thereto. Each frame type corresponds to an industrial protocol. FIG. 6 is a schematic diagram illustrating the GUI for configuring a unicast group according to an embodiment of the application. For the frame type of CC-Link IE, the user may click the checkbox to enable/disable the configuration of the SubType field. Please note that only the time slots corresponding to the traffic types of BE, Cyclic, and User-Defined (UD) (denoted in grey background in FIG. 6) need to be configured with unicast/multicast group(s).

Figure 7:
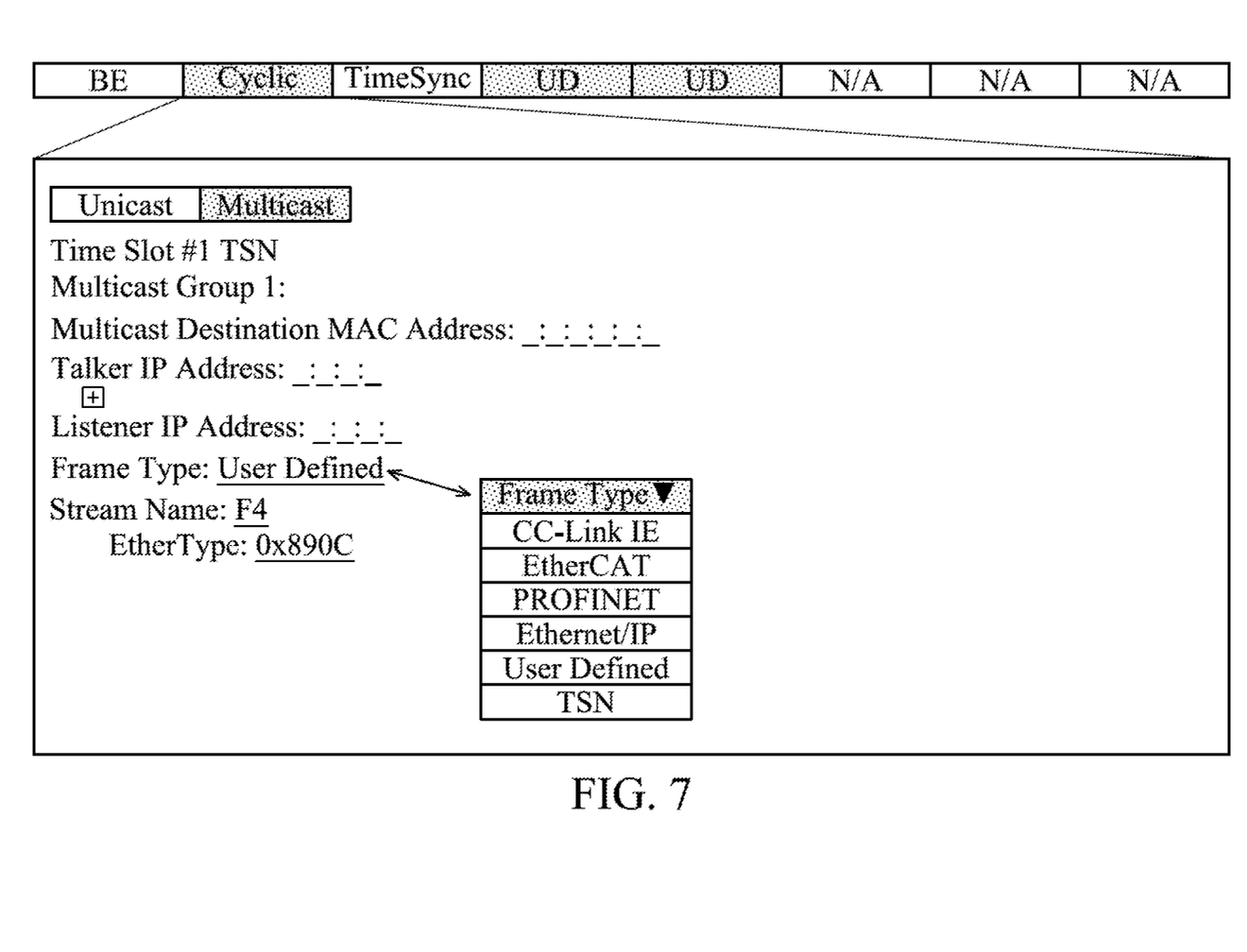
FIG. 7 is a schematic diagram illustrating the GUI for configuring a multicast group according to an embodiment of the application.

Specifically, the multicast group configuration may refer to the configuration of a multicast group associated with a TSN stream. The multicast group configuration may include the following information: (1) the name of the TSN stream, (2) the multicast destination MAC address, (3) the talker IP address, (4) the listener IP address(es), and (5) the frame type of the TSN stream of a traffic class (i.e., the information of the frame type can be referred to as a mapping of a frame type to a traffic class). That is, the mapping of frame types to traffic classes may be derived from the multicast group configuration. FIG. 7 is a schematic diagram illustrating the GUI for configuring a multicast group according to an embodiment of the application. Please note that only the time slots corresponding to the traffic types of BE, Cyclic, and User-Defined (UD) (denoted in grey background in FIG. 7) need to be configured with unicast/multicast group(s).

Figure 8:
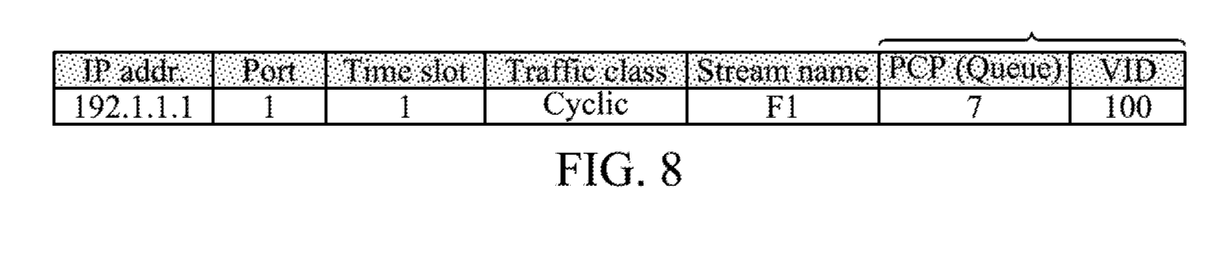
FIG. 8 is a schematic diagram illustrating the determined PCP and VID of a TSN stream according to an embodiment of the application.

In step S430, the apparatus determines a routing path, a PCP, and a GCL corresponding to the TSN stream based on the network topology of the TSN network, the application cycle configuration, and the unicast/multicast group configuration. Specifically, the apparatus may determine a Priority Code Point (PCP) and a Virtual Local Area Network (VLAN) ID (VID) of the TSN stream based on the frame type and the unicast/multicast group configuration, or the PCP and VID may be configured by the user, and the GCL may be determined based on the PCP. FIG. 8 is a schematic diagram illustrating the determined PCP and VID of a TSN stream according to an embodiment of the application.

Figure 9:
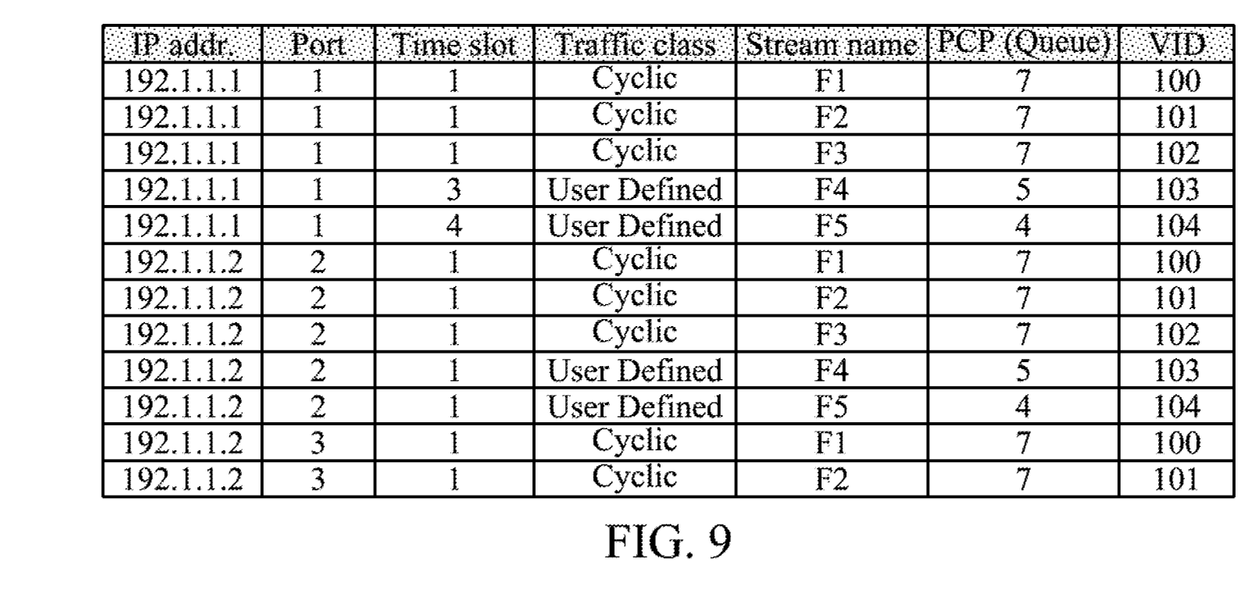
FIG. 9 is a schematic diagram illustrating the determined GCL for each TSN switch according to an embodiment of the application, wherein the IP address refers to the IP address of a TSN switch.
Figure 10:
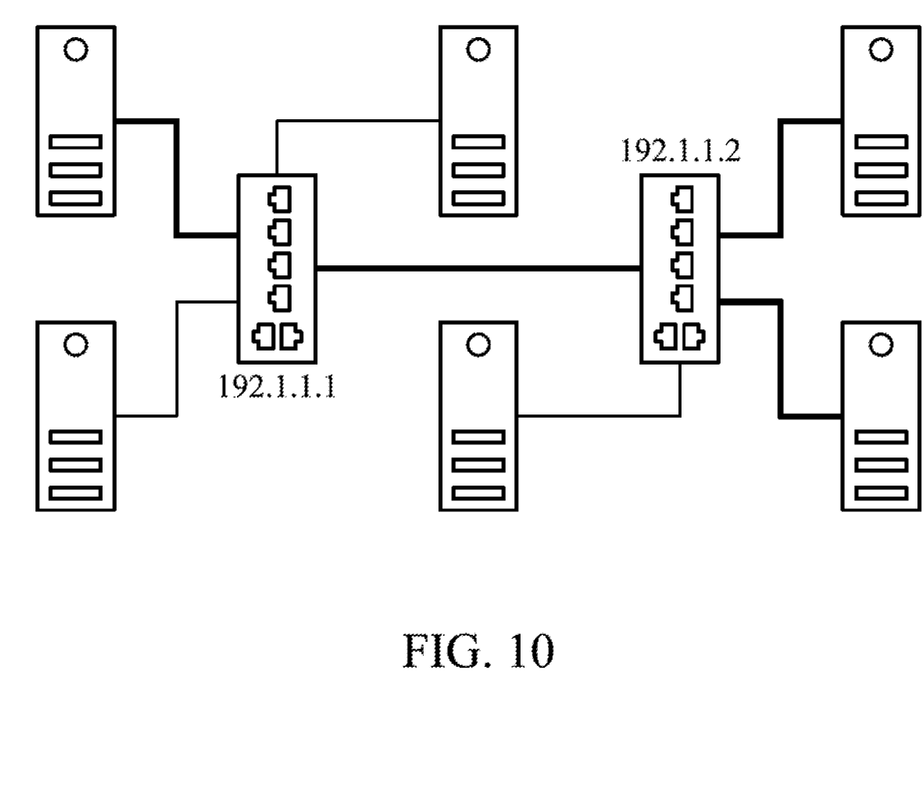
FIG. 10 is a schematic diagram illustrating a routing path of a TSN stream according to the GCL in the embodiment of FIG. 9.

In step S440, the apparatus deploys the GCL, the unicast/multicast destination MAC address, and the VID to each TSN switch in the routing path. FIG. 9 is a schematic diagram illustrating the determined routing path and GCL for each TSN switch according to an embodiment of the application, wherein the IP address refers to the IP address of a TSN switch. FIG. 10 is a schematic diagram illustrating a routing path of a TSN stream according to the GCL in the embodiment of FIG. 9. As shown in FIG. 10, the thick lines denote a routing path of a multicast TSN stream.

Figure 11:
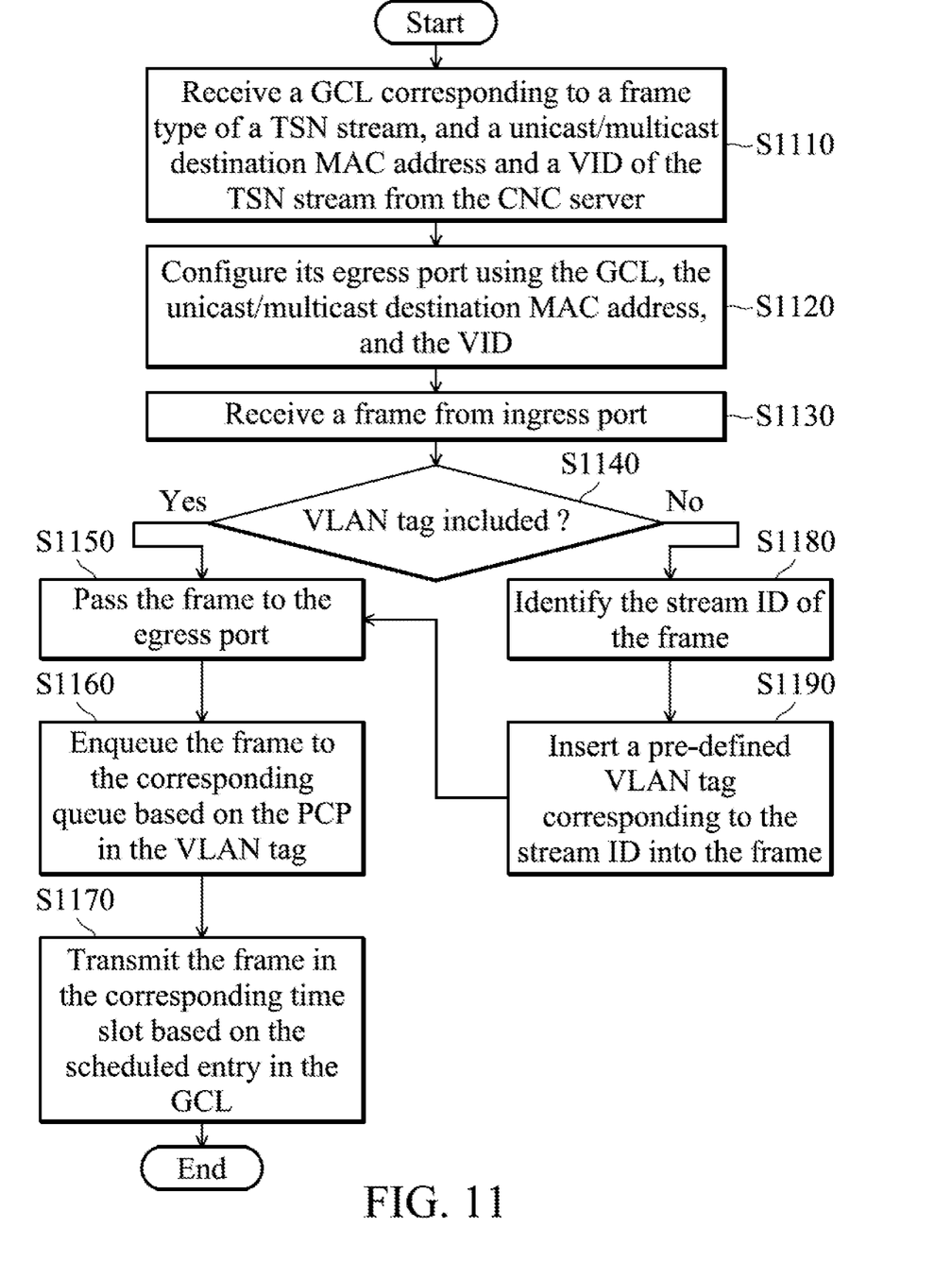
FIG. 11 is a flow chart illustrating the method for supporting class-based scheduling in a TSN network according to an embodiment of the application.

FIG. 11 is a flow chart illustrating the method for supporting class-based scheduling in a TSN network according to an embodiment of the application.

In this embodiment, the method is applied to and executed by a TSN switch (e.g., the TSN switch 111A/111B) configured by a CNC server (e.g., the CNC server 113).

In step S1110, the TSN switch receives a GCL corresponding to a frame type of a TSN stream, and a unicast/multicast destination MAC address and a VID of the TSN stream from the CNC server.

In step S1120, the TSN switch configures its egress port using the GCL, the unicast/multicast destination MAC address, and the VID.

In step S1130, the TSN switch receives a frame from its ingress port.

In step S1140, the TSN switch determines whether the frame includes a VLAN tag.

Subsequent to step S1140, if the frame includes a VLAN tag, the method proceeds to step S1150. Otherwise, if the frame does not include a VLAN tag, the method proceeds to step S1180.

In step S1150, the TSN switch passes the frame to the egress port.

In step S1160, the TSN switch enqueues the frame to the corresponding queue based on the PCP in the VLAN tag.

In step S1170, the TSN switch transmits the frame in the corresponding time slot based on the scheduled entry in the GCL.

In step S1180, the TSN switch identifies the stream ID of the frame.

In step S1190, the TSN switch inserts a pre-defined VLAN tag corresponding to the stream ID into the frame.

Subsequent to step S1190, the method returns to step S1150.

In view of the foregoing embodiments, it should be appreciated that the present application realizes data streams transmission in the class-based scheduling with guaranteed end-to-end latency in a TSN network including non-TSN end devices. Please note that the computed GCLs are different per TSN stream and per TSN switch in stream-based scheduling utilized in a pure TSN network (i.e., a TSN network includes only TSN end devices), while the computed GCLs for all TSN switches are the same in the TSN network including non-TSN end devices. Moreover, the traditional class-based scheduling utilized in an OT network only performs time slot configuration, while the class-based scheduling with guaranteed end-to-end latency in the present application not only performs time slot configuration but also configures the data streams that are allowed to transmitted in each time slot.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. An apparatus, connected to a Time-Sensitive Networking (TSN) switch in a TSN network, the apparatus comprising:
   a transceiver;
   a storage medium, configured to store a first mapping of a traffic class to a time slot and a second mapping of a type of frame of a TSN stream to the traffic class; and
   a controller, coupled to the transceiver and the storage medium, and configured to determine a routing path and a Gate Control List (GCL) corresponding to the TSN stream based on a network topology of the TSN network, the first mapping, and the second mapping, and deploy the GCL to each TSN switch in the routing path via the transceiver;
   wherein the storage medium is further configured to store second configuration of a unicast group or a multicast group associated with the TSN stream, and the second configuration comprises information of a destination Media Access Control (MAC) address, a talker IP address, and one or more listener IP addresses; and wherein the routing path and the GCL are determined based on the second configuration.

2. The apparatus as claimed in claim 1, wherein the traffic class is one of the following:
   Best Effort (BE);
   cyclic;
   Time Synchronization (TimeSync); and
   user-defined.

3. The apparatus as claimed in claim 2, wherein the type of frame is one of the following when the traffic class is cyclic or user-defined:
   Control and Communication Link using Industrial Ethernet (CC-Link IE);
   EtherCAT;
   PROFINET;
   Ethernet/Industrial Protocol (IP);
   user-defined; and
   TSN.

4. The apparatus as claimed in claim 1, wherein the storage medium is further configured to store first configuration of a time cycle comprising the time slot, and the first configuration comprises information of a starting time of the time cycle, an index of the time slot, and a duration of the time slot; and wherein the routing path and the GCL are determined based on the first configuration.

5. The apparatus as claimed in claim 1, wherein the controller is further configured to determine a Priority Code Point (PCP) and a VLAN ID (VID) of the TSN stream based on the type of frame and the second configuration, and deploy the destination MAC address and the VID to each TSN switch in the routing path via the transceiver; and wherein the GCL is determined based on the PCP.

6. The apparatus as claimed in claim 1, wherein the apparatus is a Central Network Configuration (CNC) server connected to one or more TSN switches in a TSN network.

7. A method, executed by an apparatus connected to a TSN switch in a TSN network, the method comprising:
   receiving a first mapping of a traffic class to a time slot and a second mapping of a type of frame of a TSN stream to the traffic class;
   determining a routing path and a Gate Control List (GCL) corresponding to the TSN stream based on a network topology of the TSN network, the first mapping, and the second mapping; and
   deploying the GCL to each TSN switch in the routing path;
   wherein the method further comprises receiving second configuration of a unicast group or a multicast group associated with the TSN stream, wherein the second configuration comprises information of a destination Media Access Control (MAC) address, a talker IP address, and one or more listener IP addresses; and
   wherein the routing path and the GCL are determined based on the second configuration.

8. The method as claimed in claim 7, wherein the traffic class is one of the following:
Best Effort (BE);
cyclic;
Time Synchronization (TimeSync); and
user-defined.

9. The method as claimed in claim 8, wherein the type of frame is one of the following when the traffic class is cyclic or user-defined:
Control and Communication Link using Industrial Ethernet (CC-Link IE);
EtherCAT;
PROFINET;
Ethernet/Industrial Protocol (IP);
user-defined;
TSN.

10. The method as claimed in claim 7, further comprising:
receiving first configuration of a time cycle comprising the time slot, wherein the first configuration comprises information of a starting time of the time cycle, an index of the time slot, and a duration of the time slot; and
wherein the routing path and the GCL are determined based on the first configuration.

11. The method as claimed in claim 7, further comprising:
determining a Priority Code Point (PCP) and a VLAN ID (VID) of the TSN stream based on the type of frame and the second configuration, wherein the GCL is determined based on the PCP; and
deploying the destination MAC address and the VID to each TSN switch in the routing path.

12. The method as claimed in claim 7, wherein the apparatus is a Central Network Configuration (CNC) server connected to one or more TSN switches in the TSN network.

13. A TSN switch, comprising:
an ingress port;
an egress port, comprising a plurality of queues and a plurality of gates corresponding to the queues; and
a controller, coupled to the ingress port and the egress port, and configured to receive a Gate Control List (GCL) corresponding to a type of frame of a TSN stream from a Central Network Configuration (CNC) server via the ingress port, and configure the egress port using the GCL to open one of the gates in a time slot to transmit a frame in one of the queues, which corresponds to the opened gate;
wherein the GCL is determined based on a mapping of a traffic class to the time slot and a mapping of the type of frame to the traffic class;
wherein the GCL is further determined based on second configuration of a unicast group or a multicast group associated with the TSN stream, wherein the second configuration comprises information of a destination Media Access Control (MAC) address, a talker IP address, and one or more listener IP addresses;
wherein the type of frame is corresponding to an industrial protocol.

14. The TSN switch as claimed in claim 13, wherein the traffic class is one of the following:
Best Effort (BE);
cyclic;
Time Synchronization (TimeSync); and
user-defined.

15. The TSN switch as claimed in claim 14, wherein the type of frame is one of the following when the traffic class is cyclic or user-defined:
Control and Communication Link using Industrial Ethernet (CC-Link IE);
EtherCAT;
PROFINET;
Ethernet/Industrial Protocol (IP);
user-defined;
TSN.

16. The TSN switch as claimed in claim 13, wherein the controller is further configured to receive the destination MAC address and a VLAN ID (VID) of the TSN stream from the CNC server via the ingress port, and the frame is transmitted based on the destination MAC address and the VID.

\* \* \* \* \*